April 23, 1935.  J. L. CLARK ET AL  1,999,123
INSECTICIDE APPLICATOR
Filed Oct. 16, 1933  2 Sheets-Sheet 1

Inventors
Jesse L. Clark,
Newton Mansfield,
By Spear, Donaldson & Hall
Attorneys April 23, 1935.  J. L. CLARK ET AL  1,999,123
INSECTICIDE APPLICATOR
Filed Oct. 16, 1933    2 Sheets-Sheet 2
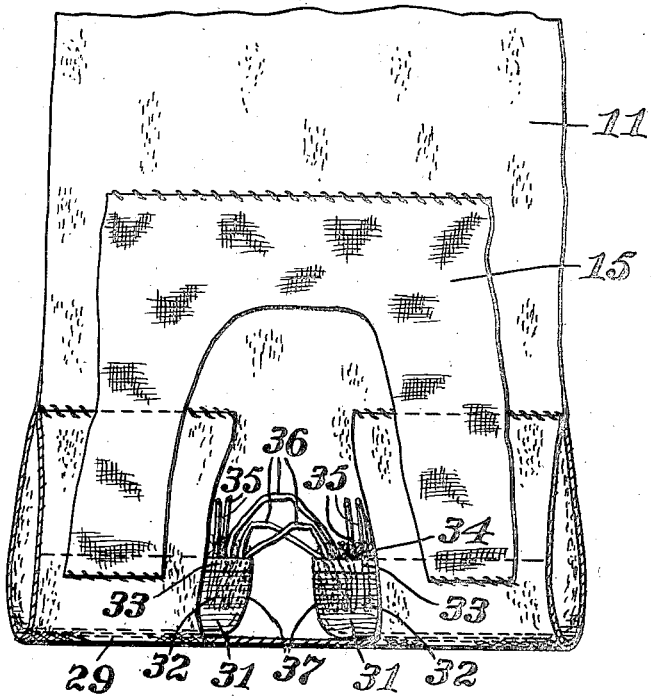
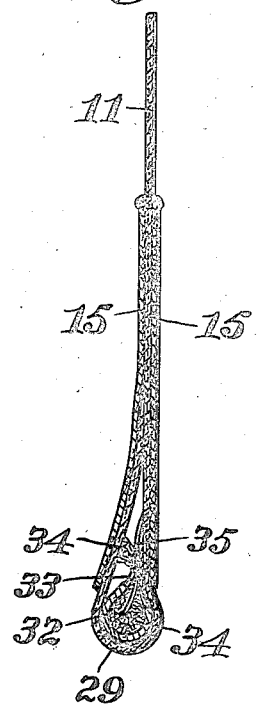
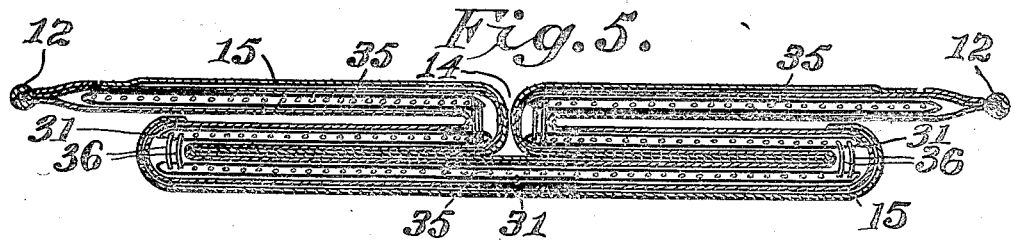
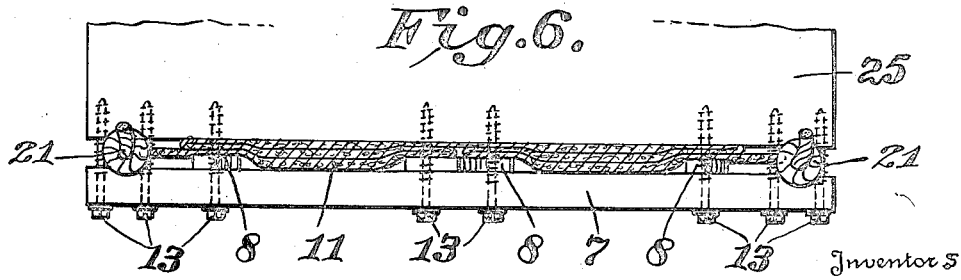
Inventors
Jesse L. Clark,
Newton Mansfield,
Attorneys Patented Apr. 23, 1935

1,999,123

UNITED STATES PATENT OFFICE 1,999,123

INSECTICIDE APPLICATOR

Jesse L. Clark and Newton Mansfield, Ashland, Ohio, assignors to Dr. Hess & Clark, Inc., Ashland, Ohio, a corporation of Ohio Application October 16, 1933, Serial No. 693,876

20 Claims. (Cl. 119—157)

This invention relates to improvements in the apparatus for applying liquid insecticide to domestic animals, disclosed in our copending application Serial Number 653,914, filed January 27, 1933.

Practical use of the former apparatus has shown that if the liquid insecticide is fed to the applicator at a sufficiently large proportionate rate to assure an adequate dose for a great number of animals, liquid will drip from the lower edge of the blanket and be wasted unless the animals pass through at regularly recurrent intervals. Since the animals pass through the apparatus at irregular intervals, and there may be long periods of time that the applicator is idle, but nevertheless, is being fed at a constant rate, the liquid will accumulate at the lower edge of the applicator and tend to drip. An object of the present invention is to provide means in the lower edge of the applicator to collect the accumulating liquid not removed by an animal and prevent its drip.

It is further apparent that if the liquid is supplied to the applicator at such a rate, based upon the total number of animals to be treated, as to insure an adequate dose to each animal, this dose must be present at the lower edge of the applicator for distribution to the animal, whether the animal passes under the apparatus immediately after, or a long time after, a preceding one. If the accumulating liquid is collected in the lower edge of the blanket in such a manner as to be inaccessible for further use, it is apparent that the animal will not receive its proper dose, the same as if that liquid had been lost by dripping from the blanket. It is an object of this invention to provide means for feeding liquid from the collecting means at the bottom of the applicator back to the applicator, as the saturation of the lower edge is decreased by passing animals.

It has further been found that the use of a sheet applicator of loosely woven material for the purpose of increasing its capillarity, results in increased wear on the applicator, particularly when horned animals are treated, due to penetration of the horns through the applicator. An object of the present invention is to provide the applicator with penetration and wear resisting means.

Another object of the invention is to simplify the construction of the apparatus while increasing its adaptability to a wider range of conditions. This involves, among other features, means for supporting and stressing the applicator.

Further objects will appear from the following description when considered in connection with the accompanying drawings, in which:

Fig. 3 is a fragmentary enlarged view of a lower portion of the applicator, parts thereof being broken away.

Fig. 4 is a section on the line 4—4 of Fig. 1.

Fig. 5 is a section on the line 5—5 of Fig. 1.

Fig 6 is a plan view of the outer portion of the shelf taken on the line 6—6 of Fig. 1.

Figure 1:
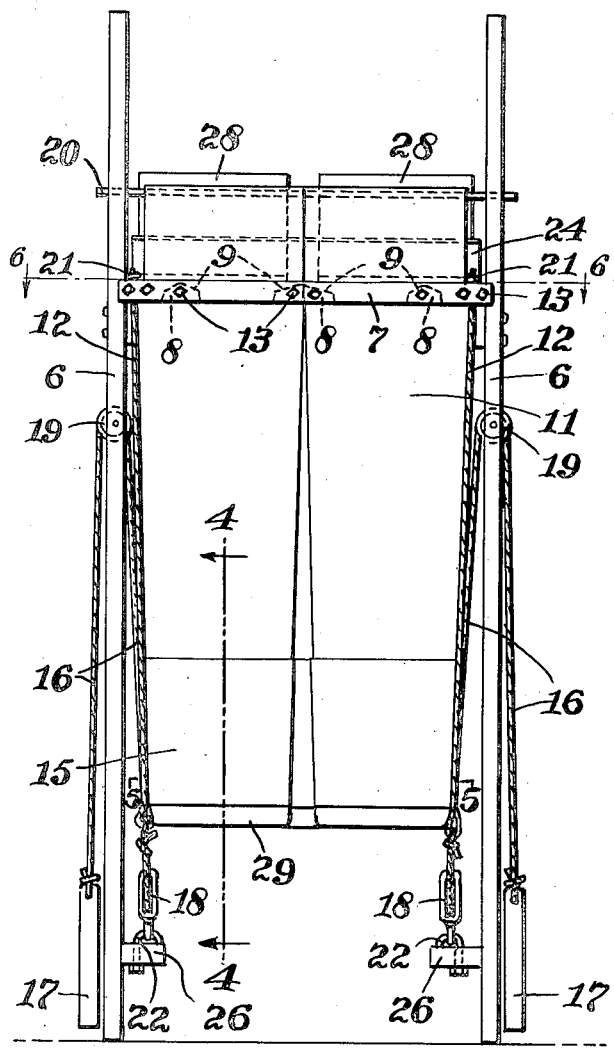
Figure 1 is a front elevation of an apparatus embodying the improvements.
Figure 2:
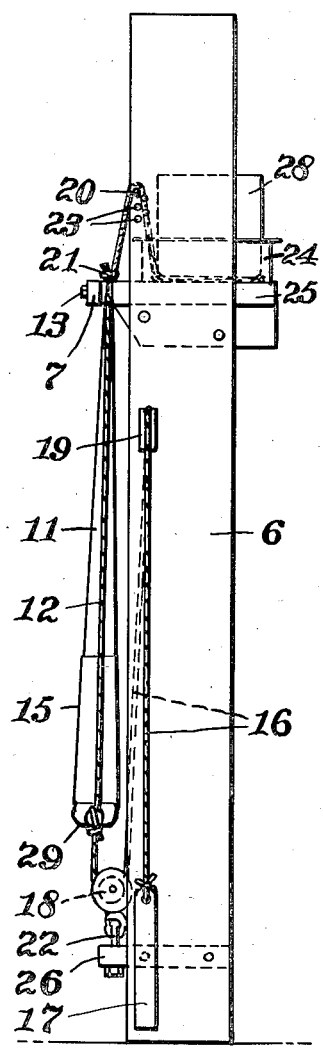
Fig. 2 is a side elevation of the apparatus.

The hanging applicator 11 positioned in the opening between the side frame bars 6 is longitudinally plicated, preferably to form a box plait. The upper portion of the applicator is looped over the cross rod 20 from which the applicator descends into the pan 24 supplied with liquid insecticide from the containers 26. The level of insecticide in pan 24 is maintained constant by reason of the fact that the containers 28 have each a single opening (not shown), opening into pan 24 and which become sealed against air by the liquid which has run into pan 24. Affixed to the vertical sides of the applicator are bands, or ropes, 12.

To support the applicator, the shelf, or cross plate, 25, extending between the bars 6 and carrying the pan 24, is widened and the applicator is affixed to its forward vertical edge. It will thus be seen that this shelf serves the two-fold purpose of supporting both the applicator and its source of liquid supply.

Fastening members, as the screws 13 disposed at various points across the width of the applicator, secure the applicator to the shelf. As shown, these screws extend through a cross bar 7 and spacer blocks 8, the spacer blocks preventing such excessive compression of the major portion of the applicator between the bar and the shelf as would retard the passage of liquid. The upper edges 9 of the blocks 8 lie below the top of the shelf and are bevelled to minimize their obstructing effect. This grip upon the applicator across its width insures retention of its lower edge in a horizontal plane and prevents sag, and consequent probability of drip. Furthermore, the clamping action retains the box plait formation of the applicator. The ropes 12 also pass between the bar 7 and shelf and have enlargements as knots 21 bearing against these clamping members to insure that the pull exerted upon the applicator by a passing animal does not dislodge the applicator.

The applicator is fed from the pan 24 by capillary attraction. The rate at which liquid is fed from pan 24 to the applicator can be controlled by varying the vertical distance between the level of the insecticide in pan 24 and the rod 20. As the rod is lowered more insecticide is delivered to the applicator. The rod 20 may conveniently be supported by vertically spaced holes 23 in the bars 6.

It is desirable that the stressing means, here shown as weights 17, be spaced from possible contact with an animal passing through the apparatus, and in some installations it is imperative that these weights be above the ground level due to concrete flooring. According to the arrangement shown, the weights are disposed laterally of the apparatus and outside the passageway, the force exerted by these weights being transmitted to the applicator by the ropes 16. These ropes 16 may be continuations of the ropes 12, or may be attached to the ropes 12 at the lower corners of the blanket, as shown. The intermediate parts of the ropes, between the weights and the applicator, are guided by sheaves 18 below the applicator and spaced closer together than the greatest width of the animal, and by sheaves 19 carried at an elevated point of the frame and in the path of the desired movement of the weights. By spacing sheaves 18 closer together than the greatest width of the animal to be treated, the lower corners of the applicator will be brought inwardly under the sides of the animal. When the plait of the applicator is opened out by the passage of the animal thereunder the applicator consequently encircles a major portion of its body. The sheaves 18 are carried in swivel blocks, which permit of free turning in either direction as the animal passes through the opening in either direction. The eyes of these swivel blocks are secured to the brackets 26 by U bolts 22 to permit swinging movement of the blocks in a vertical plane and thereby to permit automatic adjustment of the sheaves to the width of the animal as the animal passes through.

To protect the lower portion of the applicator against penetration by the horns of the animals, a sheet of wear resisting material, as canvas 15 may be attached to the applicator. As best shown in Fig. 5, the canvas extending across the outer side of the box plait may terminate at the end folds while the canvas extending across the inner side of the box plait continues nearly across the entire width of the applicator. In this manner, both sides of the applicator initially contacted by an animal are protected, as well as the surfaces within the folds. The lower edge of the canvas material terminates above the lower edge of the applicator to present an exposed portion 29 of the applicator for direct contact with an animal.

Within the lower hemmed edge of the applicator is placed a reservoir extending across the entire width of the blanket. Preferably the reservoir is in sections 31, each lying in a straight portion of the plicated applicator, as shown in Fig. 5, to leave the curved portions free to flex. Each reservoir is of flexible material, impervious to liquid at its bottom portion 32, but may be pervious to liquid at its upper portion 33 for a purpose to be described. Capillary material 34 lying within the reservoir extends exterior thereof into contact with the applicator.

To deliver liquid descending in the applicator to the reservoir, capillary material as yarn rope 35 may be attached to the applicator by being looped therethrough at a point above the reservoir, and may depend within the reservoir. This yarn acts as a wick to divert liquid from passing to the lower edge of the applicator where it would accumulate to such an extent as to result in dripping. Liquid descending in the portion of the blanket lying above the gap between adjacent reservoirs is conveyed to the reservoirs by a number of wick elements relatively closely spaced together, as shown at 36. The upper looped portions of these closely spaced wicks may slightly overlap to insure that dripping will not occur at the applicator below these points.

Liquid retained in the reservoir is returned to the applicator through the pervious portion of its wall at 33. If liquid is removed from the bottom edge of the applicator, as by delivery to an animal, the reduction in the saturation of the applicator will result in passage of liquid from the reservoir to the applicator through the pervious portion of the wall at 33. Also, because of the flexibility of the sides of the reservoir, pressure of an animal against the applicator will tend to collapse the reservoir and expel a portion of the contained liquid.

Conveniently, the reservoir may be made of sheep skin folded upon itself with the wool on the inside. The ends at 37 are sewn shut to prevent escape of the liquid, and the lower part of the exterior is shellacked to provide the impervious portion 32, the upper portion being left in its natural condition to provide the pervious portion 33. The wool prevents collapse of the reservoir, and the extruding portion contacting with the applicator serves the purpose of capillary material 34.

Where but a few animals are to be treated daily, the reservoir may be found unnecessary because of the small amount of liquid supplied to the applicator. When, however, as many as ten or more animals are to be treated, the quantity of liquid delivered to the blanket due to lowering of the rod 20, will result in dripping from the lower edge of the blanket, unless the animals pass through at regular intervals and remove the liquid as fast as it accumulates, or unless a reservoir retains the unused liquid and delivers it to the applicator as demanded. The reservoir acts as an intermediary between the upper part of the blanket which is uniformly and constantly supplied with liquid, and the lower wiping edge of the blanket from which the liquid is irregularly removed. A nice balance is obtainable, due to the presence of the reservoir, between the rate of supply of the liquid to the applicator and the total number of animals to be treated, and the factor of uncertainty as to when an animal will be treated, becomes unimportant, since it is assured of its proper dose whether it is the first one through after the apparatus has been idle for a long time, or whether it immediately follows a number of animals.

What we claim is:

1. An apparatus for the application of liquid insecticide to an animal, comprising a frame having an opening for the passage of an animal, a liquid applying sheet member supported at said opening to treat an animal passing therethrough, stressing means disposed laterally from said frame and apart from said opening to be out of possible contact with an animal passing therethrough, rope members transmitting the force exerted by the stressing means to the sheet member by attachment of the rope members to the lower corners of the sheet member, and sheaves for guiding the rope members including sheaves disposed below the lower corners of the sheet member and closer together than the distance between the lower corners, and sheaves disposed substantially in the line of action of the stressing means.

2. Apparatus according to claim 1 in which the stressing means are weight members located above the ground level and operating vertically along the outer side of the frame, and said last named sheaves are carried by the frame at elevated points.

3. The combination with a sheet member for suspension in an apparatus for applying liquid insecticide to an animal upon engagement of the animal with the lower portion of the sheet member, of an impervious reservoir at the applying end and immediately above the edge of the sheet member for carrying a localized body of the liquid and leaving the edge of the sheet member free to contact with an animal, said applying end of the sheet member receiving liquid from said impervious reservoir.

4. The combination according to claim 3 in which capillary material extends from the interior of the reservoir to the exterior thereof and into contact with the sheet member.

5. The combination according to claim 3 in which capillary material extends from the interior of the reservoir and in contact with the liquid therein, to the exterior of the reservoir into contact with the portion of the sheet member adjacent the reservoir to transfer liquid from the reservoir to the adjacent portion of the sheet member.

6. The combination according to claim 3 in which capillary material extends from a point of connection with the sheet member above the reservoir, to within the reservoir to convey liquid from the sheet member to the reservoir.

7. The combination according to claim 3 in which the lower edge of the blanket is hemmed to retain and enclose the reservoir.

8. The combination according to claim 3 in which the sheet member is folded across its width in the form of a box plait, and the reservoir is in sections, each section engaging a straight portion of the blanket leaving the curved portions of the plait free to flex.

9. The combination according to claim 3 in which the reservoir is in spaced sections extending across the width of the blanket, and capillary material connected to the sheet member above the reservoir and between the spaced reservoir sections, extends within the reservoir to convey the liquid descending in the sheet member at that point to the reservoir.

10. The combination according to claim 3 in which the reservoir is of flexible material whereby it may be compressed to expel the entrapped liquid.

11. In an apparatus of the class described, a frame having an opening for the passage of an animal, a sheet member suspended across said opening and having its lower edge adapted to deliver insecticide to an animal passing through the opening, means for supplying insecticide to the sheet member, and means carried by the frame for clamping the sheet member only at various points transversely thereof to fix the sheet at said points while leaving the remaining portions of the sheet uncompressed for the free passage of liquid, the lower edge of the sheet member thereby being maintained at one level throughout.

12. In an apparatus of the class described, a frame having an opening for the passage of an animal, a plicated reservoir extending across the opening in the path of the animal, means for stressing downwardly the ends of said reservoir, said reservoir having a wall impervious to insecticide to prevent drip, and means connected with the reservoir to become saturated with the liquid therein and adapted to deliver liquid to a passing animal.

13. In an apparatus of the class described, a frame having an opening for the passage of an animal, a plicated reservoir extending across the opening in the path of the animal, means for stressing downwardly the ends of said reservoir, said reservoir having a wall impervious to insecticide to prevent drip, and means for engagement with an animal to deliver insecticide thereto, the reservoir having flexible walls to be pressed toward each other by contact with a passing animal to expel the insecticide and supply it to the means delivering it to the animal.

14. The combination with a sheet member for suspension in an apparatus for applying liquid insecticide to an animal upon engagement of the animal with the lower portion of the sheet member, of an impervious reservoir at the lower edge of the sheet member carrying a localized body of the liquid, said reservoir being of sheep skin folded upon itself with the wool on the inside.

15. The combination according to claim 14 in which a portion of the wool extends exterior of the sheep skin reservoir and into contact with the sheet member to convey liquid thereto from the reservoir.

16. An apparatus for the application of liquid insecticide to an animal, comprising a supporting frame, a combined liquid reservoir and sheet member supporting shelf carried by the frame at an elevated point, a depending liquid applying sheet member supported at its upper portion by said shelf, and a liquid supply reservoir for the sheet member carried by the shelf, said sheet member engaging with a vertical edge of the shelf and being secured against said edge by a strip extending across the width of the sheet member, said strip being secured to the shelf by fastening means passing through the sheet member.

17. An apparatus for the application of liquid insecticide to an animal comprising a supporting frame, a combined liquid reservoir and sheet member supporting shelf carried by the frame at an elevated point, a depending liquid applying sheet member supported at its upper portion by said shelf, and a liquid supply reservoir for the sheet member carried by the shelf, said sheet member extending above its point of support by the shelf and lying within said reservoir.

18. In an apparatus for the application of liquid insecticide to an animal, a supporting frame, a liquid applying sheet member depending from said frame, rope members affixed along the vertical sides of the sheet member, and clamping elements carried by said frame and gripping said sheet member and rope members to support the sheet member in position, said clamping elements providing upwardly facing shoulders, and said rope members having enlargements bearing against said shoulders to resist displacement of said members.

19. A sheet member for suspension in an apparatus for applying liquid insecticide to an animal upon engagement of the animal with the lower portion of the sheet member, said sheet member comprising a liquid absorbing and retaining portion of permeable material folded across its width to form a box plait, and flexible wear resisting material protecting the permeable material, the bottom of the wear resisting material terminating above the bottom edge of the permeable material, whereby a saturated portion of the permeable material is exposed, and said wear resisting material being disposed to protect both outer sides of the sheet member and the surfaces between the folds of the same.

20. The combination with a sheet member for suspension in an apparatus for applying liquid insecticide to an animal upon engagement of the animal with the lower portion of the sheet member, of a reservoir at the applying end and immediately above the edge of the sheet member for carrying a localized body of the liquid and leaving the edge of the sheet member free to contact with an animal, said applying end of the sheet member receiving liquid from said reservoir, the bottom portion of the reservoir being impervious to the liquid and the upper portion being pervious to feed the entrapped liquid to the sheet member.

JESSE L. CLARK.
NEWTON MANSFIELD.